United States Patent [19]
Lane

[11] 3,854,834
[45] Dec. 17, 1974

[54] LAWN MOWER HANDLE MOUNTING DEVICE

[75] Inventor: Joseph J. Lane, Thief River Falls, Minn.

[73] Assignee: Arctic Enterprises, Inc., Thief River Falls, Minn.

[22] Filed: Oct. 9, 1973

[21] Appl. No.: 404,391

[52] U.S. Cl.............. 403/386, 16/111 A, 56/320.1
[51] Int. Cl.............................................. F16b 7/00
[58] Field of Search .......... 16/111 A; 403/241, 244, 403/386, 388; 56/320.1; 280/47.37; 294/49, 54, 57, 7

[56] References Cited
UNITED STATES PATENTS

| 450,449 | 4/1891 | Daly.................................... 294/49 |
| 2,688,834 | 9/1954 | Kaeser........................... 16/111 A |

Primary Examiner—Andrew V. Kundrat
Attorney, Agent, or Firm—Molinare, Allegretti, Newitt & Witcoff

[57] ABSTRACT

A handle for a lawn mower is secured to the deck thereof by extending the appropriately bent lower end of the handle through a correspondingly shaped opening in the deck and fastening the lower ends to the deck employing simple fastening means.

4 Claims, 3 Drawing Figures

PATENTED DEC 17 1974

3,854,834

LAWN MOWER HANDLE MOUNTING DEVICE

BACKGROUND OF THE INVENTION

Heretofore handles were fastened to the decks of lawnmowers by fastening various types of brackets to the decks and then fastening the handle to the brackets by various means.

SUMMARY OF THE INVENTION

The present invention provides means for simply and economically and sturdily securing the handle to the deck of the lawnmower without the use of brackets or similar fastening means.

DESCRIPTION OF THE PREFERRED EMBODIMENT

Figure 1:
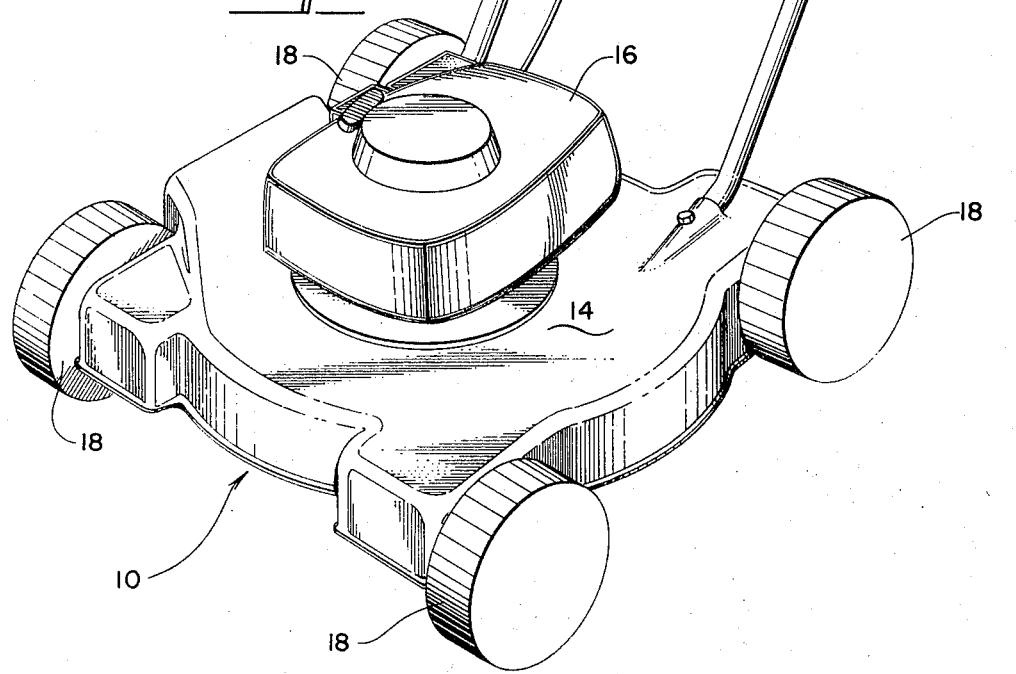
FIG. 1 is a perspective view of a lawn mower device having a handle secured thereto with the mounting device of the present invention.

The lawn mower 10 of FIG. 1 illustrates a preferred application of the principal of the present invention although it may be applied to any one of various other implements. The mower 10, which may be of any shape or form, is provided with a handle means 12 which is secured to the deck or housing structure 14 by the mounting means of the invention as described in greater detail below.

A typical lawn mower would also include a motor 16 (shown schematically) which drives a cutting blade (not shown) beneath the deck, and a plurality of wheels 18 (shown schematically).

The upper portion of the handle 12 may be of solid tubular construction as shown in the drawings or may employ any number of folding means well known in the art. The upper portion of the handle 12 preferably includes two parallel shafts and is of a length and is formed at an angle to be comfortable for the operator of the mower 10. The shafts preferably have a circular transverse cross-section.

Figure 2:
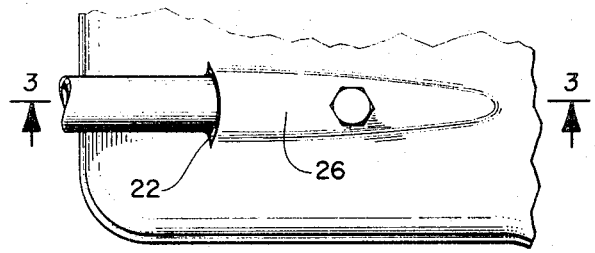
FIG. 2 is a partial top plan view of the mower showing the mounting device.
Figure 3:
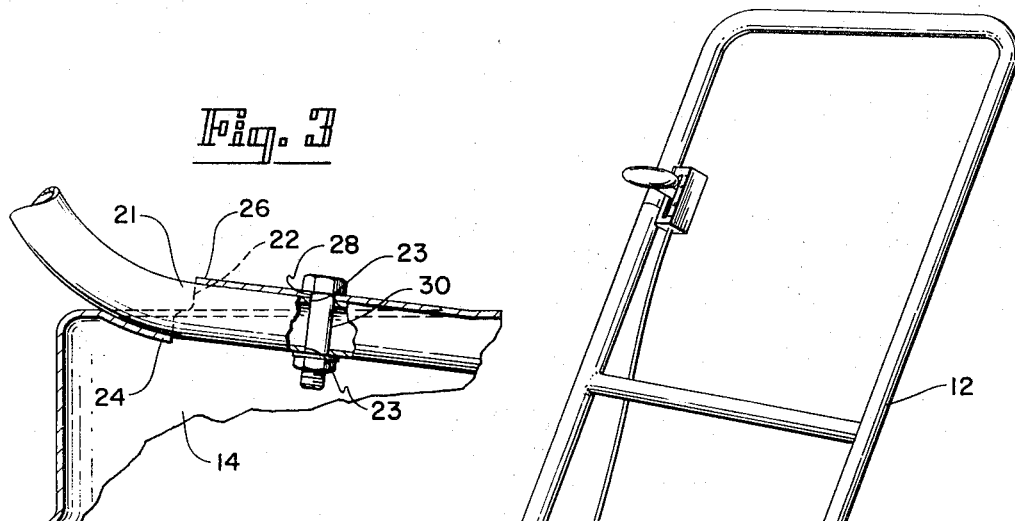
FIG. 3 is a cross-sectional view taken along line 3—3 of FIG. 2.

As shown more particularly in FIGS. 2 and 3, the invention resides in the attachment of the free ends 18 of the parallel shafts of the handle 12 to a seating means 20 in the deck 14. A radius 21 is formed in the shafts between the upper portion of the handle 12 and the free ends 18. Preferably, a pair of opposed apertures 23 are provided in the free ends 18 of the handle 12.

The deck 14 is formed so that the seating means 20 includes an opening 22, a longitudinal depression 24 extending rearwardly from and above the plane of the normal deck surface the opening 22 and below the plane of the normal deck surface, and a longitudinal elevation 26 extending forwardly from opening 22. The opening 22, depression 24 and elevation are all formed to correspond in transverse dimension of the free ends 18 of the handle shafts. Because the preferred shaft cross-section is circular, the transverse sections of these elements conform roughly to arcs of a circle. The elevation 26 includes an aperture 28 suitable for receiving a bolt 30 or other suitable fastening means.

As best shown in FIG. 3, the handle 12 is attached to the deck 14 merely by inserting the free ends 18 through opening 22 to a point where opposed aperture 23 in the free ends 18 align with aperture 28 in elevation 26. The bolt 30 is then inserted through apertures 23 and 28 and the bolt is secured by means of a nut 32 or other suitable fastening means.

With the handle 12 thus secured to the deck it can be seen that the upper surfaces of free ends 18 bear continuously on the undersides of elevation 26 and the lower surfaces of free ends 18 bear on the upper surfaces of depressions 24. This provides a rigid and strong construction which is necessary for "rocking" the mower during operation.

From the above it is apparent that the present invention provides a lawn mower handle mounting device which is simple and easy to construct, is simple to remove for shipping and storage, but is sturdy and rigid once fastened to the mower.

The invention and many of its advantages will be understood from the foregoing description and it will be apparent that various changes may be made in the form and construction thereof without departing from the spirit and scope of the invention or sacrificing its material advantages, the form described being merely a preferred embodiment thereof.

I claim:

1. In a powerized lawn mower assembly, improved structure for securing a substantially upright handle assembly to said lawn mower assembly, improvement comprising, in combination, a pair of elongated substantially upright arms defined on said handle assembly and having frontwardly directed, unitary lower end portions, each of said end portions having a front section and a rear section, a top deck for said lawn mower assembly, a pair of laterally spaced means deformed from said deck for receiving each of said end portions, said receiving means each including a forward portion elevated above the plane of said deck and having a linear axis and a rear portion depressed below the plane of said deck and having a curved axis, a rearwardly facing opening at the juncture between each of said elevated and depressed portions, each said opening receiving each said end portion, each said front section bearing directly against the inner surface of each said elevated portion, each said rear section bearing directly against the outer surface of each said depressed portion, and a fastener for rigidly interconnecting each said front section and each said elevated portion.

2. The structure of claim 1 wherein said receiving means in said deck, said end portions on said handle assembly, and said fasteners define the sole means for securing said handle assembly to said lawn mower assembly.

3. The structure of claim 1 wherein one fastener only is used for securing each elevated portion to each said front section.

4. The structure of claim 1 wherein said end portion is substantially circular in cross-section and said opening is substantially circular in cross-section, said opening thereby receiving each said end portion in snug relationship.

* * * * *